March 13, 1945.      A. Y. DODGE      2,371,229
TORQUE TRANSMISSION
Filed July 12, 1943
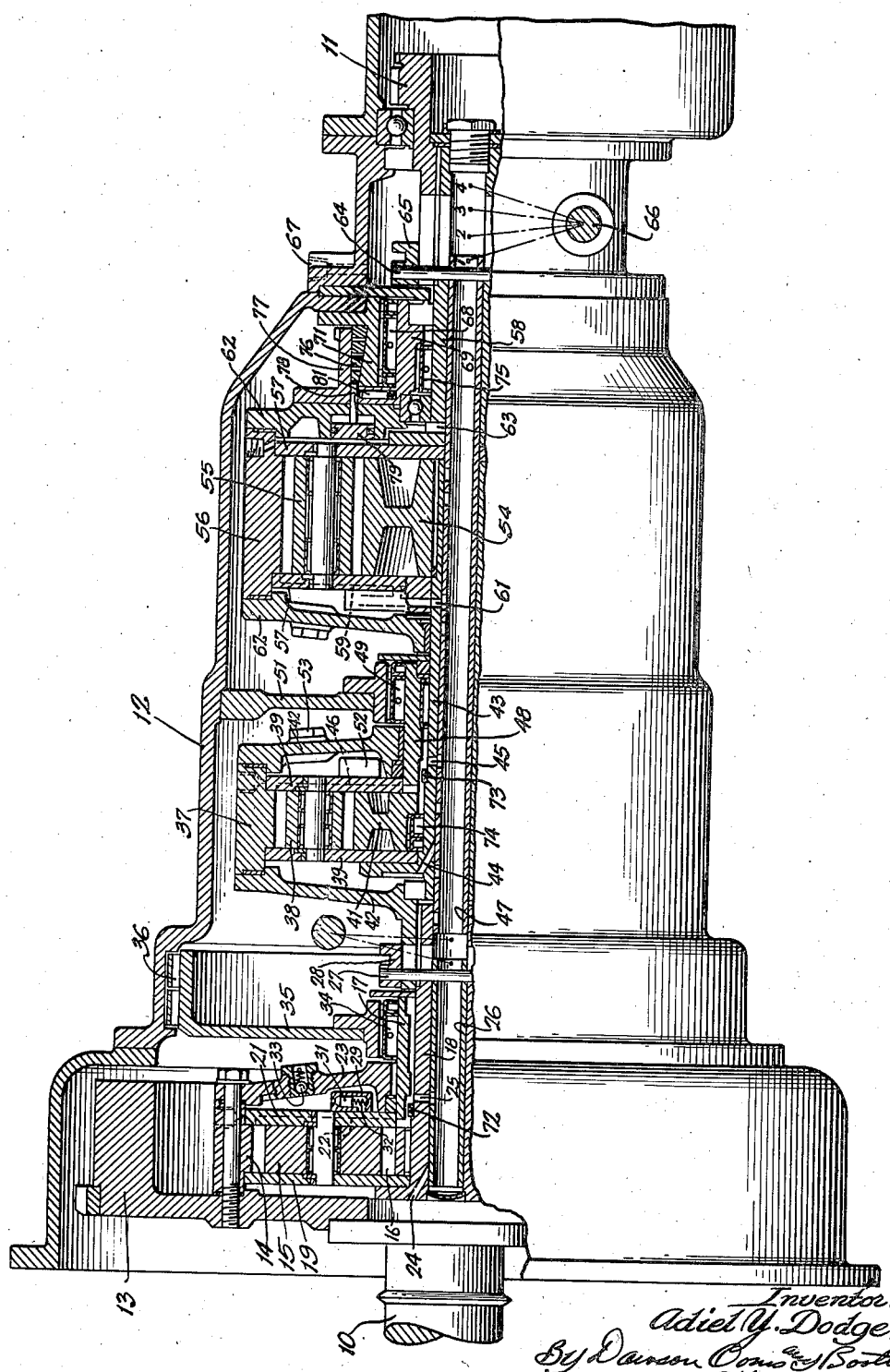
Inventor:
Adiel Y. Dodge,
By Dawson, Cono & Booth
Attorneys.

Patented Mar. 13, 1945

2,371,229

UNITED STATES PATENT OFFICE 2,371,229

TORQUE TRANSMISSION

Adiel Y. Dodge, Rockford, Ill.

Application July 12, 1943, Serial No. 494,291

13 Claims. (Cl. 74—293)

This invention relates to torque transmission and more particularly to fluid operated transmissions for transmitting torque at a plurality of different ratios between driving and driven shafts.

One of the objects of the invention is to provide a transmission which is capable of producing a large number of ratios by means of a relatively simple mechanism which is easily controlled.

Another object of the invention is to provide a transmission which provides positive gear ratios shifted by fluid clutches to form a cushion drive.

Still another object of the invention is to provide a torque transmission in which overrunning of the driven shaft is prevented.

A further object of the invention is to provide a torque transmission in which torque is transmitted through one or more differential gear units which act both as fluid clutches and reduction gears.

The above and other objects and advantages of the invention will be more readily apparent from the following description when read in connection with the accompanying drawing in which the single figure is a side elevation with parts in section of a transmission embodying the invention.

The transmission illustrated is adapted to connect a driving shaft 10 which may be the crank shaft of an internal combustion engine, to a driven shaft 11 which may be connected to the driving wheels of a vehicle or other load to be driven. The entire mechanism is enclosed in a stationary housing 12 which may be mounted in place of the usual transmission casing, in a vehicle.

The driving shaft 10 is connected to a fly wheel 13 which rigidly carries a ring gear 14 forming part of a planetary differential gear unit. The ring gear meshes with planet pinions 15 which, in turn, mesh with a sun gear 16 carried by a sleeve 17 which rotatably surrounds a tubular shaft 18. The planet pinions 15 are carried by a gear carrier formed by side plate 19 which is rigidly connected to the shaft 18 and opposite side plate 21, the side plate 21 is formed with inlet passages 22 which communicate with the spaces between the gears. The side plates carry suitable blocks, not shown, which enclose the space between the gear teeth so that the gear unit forms a fluid pump.

Fluid enters the pump through the inlet passages 22 and is discharged through suitable outlet passages, not shown, in the side plates.

The gear unit is enclosed by a cover plate 23 connected to the ring gear 14 and sealed around the sleeve 17 to form a discharge chamber for the unit. Preferably, the pressure on the opposite sides of the unit is equalized by providing hollow pins extending through the carrier on which the planet pinions are mounted. Fluid from the planetary unit is adapted to be discharged through a port 24 in the tubular shaft 18 and fluid from the shaft 18 is admitted through an inlet port 25 to the passages 22.

The inlet and outlet ports are controlled by a tubular valve 26 slidable in the shaft 18 and operated through a pin 27 by a collar 28. The collar is adapted to be shifted axially of the shaft through a suitable yoke mechanism, not shown. When the valve 26 is in the position shown, it opens the inlet port 25 to the interior of the shaft 18 and closes the outlet port 24. At this time fluid will be admitted to the gear unit but since the discharge passage is closed the gear unit will be locked to turn as a unit and to transmit through it a one-to-one ratio. When the valve 26 is shifted to the right, it closes the port 25 and opens the port 24 so that fluid will be discharged from the unit freely and the gears may rotate relative to each other without interference.

In order that the gear unit may slip at relatively low speeds to pick up the load gradually, a by-pass from the outlet to the inlet side of the unit is provided. As shown, the valve is formed by an angular casing 29 connected to the inlet passages 22 and terminating in a valve seat facing radially outward. A valve member 31 is mounted in the casing 29 and is urged toward the seat by centrifugal force and by a spring 32. If desired, the valve member may be made relatively light and the spring 32 relatively strong so that the centrifugal effect on the valve is minimized but preferably the valve is relatively heavy and the spring is relatively weak so that the centrifugal effect will predominate.

With this construction when the outlet port 24 is closed, pressure will build up in the space around the planetary unit and will be by-passed by the valve 31 to the inlet passages to permit slippage in the unit. At low speeds the valve will open easily so that the unit will slip under a relatively low torque while at high speeds a higher outlet pressure will be required to open the valve so that slipping will not occur as readily. Thus, any tendency toward shock in the mechanism at relatively low speeds when shifting normally occurs will be eliminated while at higher speeds the unit will operate at maximum efficiency without slippage.

Preferably, a safety relief valve 33 is provided in the cover plate 23 to relieve excess pressures so that damage to the mechanism will be prevented. This valve is normally closed and opens only under a higher pressure than that required to open the valve 31 so that it functions purely as a safety valve to relieve dangerous pressures in the event of expansion of fluid under temperature changes.

In order that the gear unit may function as a reduction gear as well as a fluid clutch means are provided to hold the sun gear 16 against reverse rotation. As shown, such means comprises a combined one-way clutch and bearing unit 34 connecting the sleeve 17 to a brake drum 35. The brake drum may be connected to the stationary housing 12 by a brake band 36 which is preferably controlled simultaneously with shifting of the collar 28.

The tubular shaft 18 is connected to a ring gear 37 of a second planetary unit which is substantially similar to the unit just described except that it has a different gear ratio. The second unit comprises a set of planet pinions 38 carried by a carrier formed by plates 39 and a sun gear 41. Side plates 42 connected to the ring 37 enclose the planetary unit and the space within the side plates is adapted to be connected to a tubular shaft 43, which is connected to the plates 39, by a discharge port 44. An inlet port 45 in the shaft 43 connects to inlet passages 46 in one of the side plates 39 and the ports 44 and 45 are controlled by a slidable valve 47 in the shaft 43. The sun gear 41 is mounted on a sleeve 48 which is connected by a combined one-way clutch and bearing 49 to a rib or flange 51 secured to the housing 12. A by-pass valve 52 and relieve valve 53 similar to the valve units 29 and 33 respectively are provided.

The shaft 43 is connected to the sun gear 54 of a third planetary unit which includes planet pinions 55 and a ring gear 56. Preferably, the gear ratio of gears 54, 55 and 56 is different than that of the first two described planetary units. The planet pinions 55 are carried by a gear carrier formed by side plates 57 which are connected to a driven shaft 58 which is, in turn, connected to the driven shaft 11 and which are formed with inlet passages 59 communicating through a port 61 in the tubular shaft 43 with the interior of the shaft. Side plates 62 are connected to the ring gear 56 to enclose the planetary gear unit and the space within the side plates communicates through an outlet port 63 with the shaft 43. It will be noted that the ports 61 and 63 are controlled by the slide valve 47 through spaced ports therein which are so arranged that the second and third planetary units may be selectively controlled.

The slide valve 47 is operated through a pin 64 and a collar 65 through a yoke, not shown, which is turned by a control shaft 66. The collar 65 is adapted to occupy any one of four positions numbered respectively, one, two, three, four, to perform different control functions. Fluid is supplied to the interior of the valve 47 and through it to the interior of the valve 26 from a supply port 67 in the casing 12.

In order that the third planetary unit may operate as a gear reduction unit, the ring gear 56 thereof is adapted to be held against reverse rotation by a combined one-way brake and bearing 68 acting between an extension 69 on the ring and gear cover plate 62 and a fixed sleeve 71 carried by the housing 12.

In operation of the unit as so far described, it is possible by shifting the two valves 26 and 47 to obtain eight forward speeds at different ratios. With both valves in the positions shown, the discharge ports for all of the units are closed so that all of the units are functioning as fluid clutches and torque will be transmitted between the driving and driven shafts at a one-to-one ratio. For the next lower ratio the valve 47 is shifted to the right to open the discharge port 44 and close the inlet port 45, the inlet port 61 remaining open in this position. At this time, the second unit operates as a gear reduction unit to drive the sun gear 54 of the third unit at reduced speed and increased torque so that the driven shaft will be driven from the driving shaft at a lower speed and a higher torque. For the next lowest ratio, the valve 47 is shifted further to the right to open the discharge port 63 and close the inlet port 61, the inlet port 45 being open at this time and the discharge port 44 again being closed. In this position the first two planetary units operate as clutches and the third planetary unit functions as a reduction gear to reduce the speed and increase the torque on the driven shaft. While the diameters of the several gears in the second and third planetary units are substantially the same, it will be noted that a greater torque increase is effected by the third unit than by the second, since the sun gear of the third unit forms its driving member, while the ring gear of the second unit forms its driving member.

For the next driving ratio the valve 47 may be moved further to the right so that the yoke 65 occupies the position marked 4 in which position both discharge ports 44 and 63 are open and both inlet ports 45 and 61 are closed. In this position both the second and third planetary units function as reduction gears to effect a double reduction.

The next ratio is accomplished by returning the valve 47 to its initial position and shifting the valve 26 to the right to close the inlet port 25 and open the discharge port 24. In this position, the second and third planetary units function as fluid clutches and the first planetary unit operates as a reduction unit to transmit the torque of the driving shaft to the intermediate shaft 18 at reduced speed and increased torque. At this time, the brake band 36 is engaged so that the sun gear 16 will be held against reverse rotation through the one-way brake 34. It will be noted that this one-way brake 34 could be omitted if desired, in which case, it would be necessary to operate the brake 36 more frequently. When the one-way brake 34 is employed, the brake 36 may be engaged at all times except when it is desired that no torque be transmitted.

Three additional gear ratios may be obtained by leaving the valve 26 shifted to the right and shifting the valve 47 to the second, third and fourth positions described above. In the last position, in which all of the inlet ports are closed and all of the discharge ports are opened for all three units, the maximum torque multiplication is obtained since all units are functioning as reduction gears in series.

In order to prevent the driven shaft from overrunning the driving shaft, means are provided associated with each of the planetary units so that they will transmit torque in a forward direction from the driven shaft to the driving shaft. The means as shown, for the first planetary unit comprises a check valve to prevent back flow of fluid from the unit through the inlet port 25. In the form shown, the check valve comprises a ring 72 slidable on the shaft 18 and adapted to be moved into register with the port 25 by fluid acting against its outlet side. When the unit again operates to pump fluid from the port 25 through the discharge ports, the ring 72 will be shifted back to the position shown in which it does not interfere with flow of fluid. When torque acting through the shaft 18 tends to drive the carrier 19 ahead of the ring gear 14, the relative direction of rotation of the gears is reversed so that they tend to force fluid through the inlet port. This is prevented by the ring 72 so that the unit in this construction functions as a clutch to connect the shaft 18 to the driving shaft 10.

A similar ring 73 is mounted on the shaft 43 to close the inlet port 45 of the second planetary unit upon a reversal of the direction of fluid flow through this unit. In addition to the ring 73, or as a substitute therefor, reverse flow of torque through the second unit may be provided for by a combined one-way clutch and bearing 74 connecting the shaft 43 and the sun gear 41. The unit 74 is arranged to permit the shaft 43 to turn forward relative to the sun gear but to prevent the sun gear from turning forward relative to the shaft or the shaft from turning backward relative to the sun gear. Upon a reversal in the direction of torque flow, the clutch 74 will connect the sun gear to the shaft so that both the sun gear and gear carrier are rigid with the shaft and the second planetary set will turn as a unit to transmit torque from the driven to the driving shaft.

A one-way clutch 75 is provided in the third planetary unit to transmit overrunning torque therethrough and connects the driven shaft 58 to the flange 69 on the ring gear 56. When the driven shaft tends to overrun the driving shaft this clutch engages to turn both the ring gear and the gear carrier with the driven shaft so that overrunning torque will be transmitted at a one-to-one ratio.

As shown in connection with the third unit, means may be provided to transmit overrunning torque at a reduced ratio so that the engine will exert a greater braking effect. For this purpose, a one-way wrap-down type brake 76 is mounted to act between a flange 77 on the ring gear 56 and the fixed sleeve 71 on the casing. The brake 76 is normally engaged by its own spring tension to connect the ring gear 56 to the stationary casing and is adapted to be disengaged by a plunger 78 connected to a piston 79 working in a cylindrical bore in one of the side plates 62. The piston 79 is exposed to the outlet pressure of the third planetary set and is adapted to be urged to the right by this pressure to disengage the brake 76. In this construction, the brake 76 will be engaged at all times except when the outlet port 63 is closed so that torque will be transmitted through the third planetary unit at a reduced ratio in both directions. When the discharge port 63 is closed, pressure in the housing acting on the piston 79 will move it to the right to disengage the brake 76 so that the ring gear can turn forward freely for one-to-one forward drive through the third planetary unit.

At high speeds it is desirable that overrunning torque should be transmitted at a unitary rather than a reduced ratio and under such conditions the brake 76 is held disengaged by a plunger 81 movable radially outward in the side plate 62 to engage a notch in the rod 78. When the piston and rod have been moved to the right by fluid pressure, the plunger 81 will move into the notch with a force dependent upon the speed or rotation to hold the plunger in a position to disengage the brake 76 even through the fluid pressure acting on the piston 79 should drop. Thus if there should be a torque reversal at high speed, the overrunning torque will be transmitted at a unitary ratio through the several units to the driving shaft while at low speed the brake 76 will be engaged to provide a gear reduction between the driven and driving shafts.

While one embodiment of the invention has been shown and described in detail herein, it is to be understood that this is illustrative only and is not to be taken as a definition of the scope of the invention, reference being had for that purpose to the appended claims.

What is claimed is:

1. In a torque transmission, a torque transmitting unit comprising a planetary differential gear set, means inclosing the gears of said gear set and providing inlet and outlet ports therefor whereby they form a fluid pump, valve means controlling the inlet and outlet of fluid to the gear set, means to control the valve means to open the inlet port and close the exhaust port or to close the inlet port and open the exhaust port and a normally closed check valve connecting the outlet of the gear set to the inlet and so constructed and arranged as to close in response to centrifugal force.

2. In a torque transmission, a torque transmitting unit comprising a planetary differential gear set, means inclosing the gears of said set whereby they form a fluid pump, a hollow shaft on which the gear set is mounted and formed with inlet and outlet ports for the gear set, and a ring slidable on the shaft to close the inlet port to prevent back flow of fluid therethrough.

3. In a torque transmission, a torque transmitting unit comprising a planetary differential gear set, means inclosing the gears of said gear set and providing inlet and outlet ports therefor whereby they form a fluid pump, valve means controlling the inlet and outlet of fluid to the gear set, one element of the gear set being connected to a driving member and another element being connected to a driven member, means holding a third element of the gear set against rotation in one direction to provide a reaction member, and means to hold the third element against forward rotation relative to said driven member whereby torque may be transmitted from the driven member to the driving member.

4. In a torque transmission, a torque transmitting unit comprising a planetary gear set including a sun gear, a ring gear and a planet carrier carrying planet pinions meshing with the sun and ring gears, means inclosing the gears and pinions and providing inlet and outlet ports therefor whereby they form a fluid pump, driving and driven members connected to the planet carrier and to one of the gears, means holding the other gear against reverse rotation to form a reaction member, and means to prevent forward rotation of said other gear relative to the driven member.

5. In a torque transmission, a torque transmitting unit comprising a planetary gear set including a sun gear, a ring gear and a planet carrier carrying planet pinions meshing with the sun and ring gears, means inclosing the gears and pinions and providing inlet and outlet ports therefor whereby they form a fluid pump, driving and driven members connected to the planet carrier and to one of the gears, means holding the other gear against reverse rotation to form a reaction member, and means to prevent forward rotation of said other gear relative to the driven member, the last named means comprising a check valve to prevent back flow of fluid through the inlet port.

6. In a torque transmission, a torque transmitting unit comprising a planetary gear set including a sun gear, a ring gear and a planet carrier carrying planet pinions meshing with the sun and ring gears, means inclosing the gears and pinions and providing inlet and outlet ports therefor whereby they form a fluid pump, driving and driven members connected to the planet carrier and to one of the gears, means holding the other gear against reverse rotation to form a reaction member, and means to prevent forward rotation of said other gear relative to the driven member, the last named means comprising a one-way clutch acting between said other gear and the driven member.

7. In a torque transmission, a torque transmitting unit comprising a differential gear set, means inclosing the gears of the set and providing inlet and outlet ports therefor whereby it forms a fluid pump, driving and driven members connected respectively to two elements of the gear set, brake means to hold a third element of the gear set against rotation, and means responsive to the outlet pressure from the gear set to control the brake means.

8. In a torque transmission, a torque transmitting unit comprising a differential gear set, means inclosing the gears of the set and providing inlet and outlet ports therefor whereby it forms a fluid pump, driving and driven members connected respectively to two elements of the gear set, normally engaged brake means to hold a third element of the gear set against rotation, and means responsive to the outlet pressure from the gear set to disengage the brake means.

9. In a torque transmission, a torque transmitting unit comprising a differential gear set, means inclosing the gears of the set and providing inlet and outlet ports therefor whereby it forms a fluid pump, driving and driven members connected respectively to two elements of the gear set, a one-way brake to hold a third element of the gear set against reverse rotation, brake means to hold the third element against forward rotation, and means responsive to the outlet pressure from the gear set to disengage said brake means.

10. In a torque transmission, a torque transmitting unit comprising a differential gear set, means inclosing the gears of the set and providing inlet and outlet ports therefor whereby it forms a fluid pump, driving and driven members connected respectively to two elements of the gear set, normally engaged brake means to hold a third element of the gear set against rotation, means responsive to the outlet pressure from the gear set to disengage the brake means, and means responsive to centrifugal force cooperating with the last named means to hold the brake means disengaged.

11. In a torque transmission, a torque transmitting unit comprising a differential gear set, means inclosing the gears of the set and providing inlet and outlet ports therefor whereby it forms a fluid pump, driving and driven members connected respectively to two elements of the gear set, a brake to hold a third element of the gear set against rotation, a plunger responsive to the outlet pressure from the gear set to disengage the brake, and a pin responsive to centrifugal force engaging the plunger and tending to hold it in a position to disengage the brake.

12. A torque transmission for connecting a driving shaft to a driven shaft comprising a pair of differential gear units, means inclosing the gears of each unit and providing inlet and outlet ports therefor whereby each unit forms a fluid pump, a drive member connected to one element of one unit, a driven member connected to one element of another unit, means connecting other members of the units, means holding third members of the units against reverse rotation, and a single control valve member movable to one position in which it closes the inlet ports of both units, to a second position in which it opens the inlet port and closes the exhaust port of one unit, and to a third position in which it opens both inlet ports and closes both exhaust ports.

13. A torque transmission for connecting a driving shaft to a driven shaft comprising a plurality of differential gear units, means inclosing the gears of each unit and providing inlet and outlet ports therefor whereby each unit forms a fluid pump, a drive member connected to one element of one unit, a driven member connected to one element of another unit, means connecting other members of the units, one-way brakes holding third elements of the units against reverse rotation, a tubular shaft on which said units are mounted having openings therein communicating with said inlet and outlet ports, and a single valve member shiftable in the shaft to control all of said openings.

ADIEL Y. DODGE.